US011068795B2

(12) United States Patent
Chestnut et al.

(10) Patent No.: US 11,068,795 B2
(45) Date of Patent: *Jul. 20, 2021

(54) AUTOMATICALLY PREDICTING THAT A PROPOSED ELECTRONIC MESSAGE IS FLAGGED BASED ON A PREDICTED HARD BOUNCE RATE

(71) Applicant: The Rocket Science Group LLC, Atlanta, GA (US)

(72) Inventors: Benjamin Chestnut, Atlanta, GA (US); Nathaniel Bainton, Atlanta, GA (US); John Foreman, Avondale Estates, GA (US); William Hoffmann, Decatur, GA (US); Chad Morris, Marietta, GA (US); Cass Petrus, Atlanta, GA (US); Sean Sawyer, Atlanta, GA (US); Joe Uhl, Mableton, GA (US)

(73) Assignee: THE ROCKET SCIENCE GROUP LLC, Atlanta, GA (US)

( * ) Notice: Subject to any disclaimer, the term of this patent is extended or adjusted under 35 U.S.C. 154(b) by 616 days.

This patent is subject to a terminal disclaimer.

(21) Appl. No.: 16/028,977

(22) Filed: Jul. 6, 2018

(65) Prior Publication Data

US 2018/0336495 A1   Nov. 22, 2018

Related U.S. Application Data

(63) Continuation of application No. 14/216,654, filed on Mar. 17, 2014, now Pat. No. 10,115,060.
(Continued)

(51) Int. Cl.
*G06N 5/04* (2006.01)
*G06N 5/02* (2006.01)
(Continued)

(52) U.S. Cl.
CPC ............... *G06N 5/04* (2013.01); *G06N 5/022* (2013.01); *G06N 20/00* (2019.01); *G06N 20/20* (2019.01);
(Continued)

(58) Field of Classification Search
CPC .......... G06N 5/04; G06N 20/20; G06N 20/00; G06N 5/022; G06Q 10/107;
(Continued)

(56) References Cited

U.S. PATENT DOCUMENTS 7,689,652 B2  3/2010 Mishra et al.
2006/0026242 A1  2/2006 Kuhlmann et al.
(Continued)

OTHER PUBLICATIONS

"Controlling the Assault of Non-Solicited Pornography and Marketing Act of 2003", CAN-SPAM Act, 15 U.S.C. Chapter 103, Sections 7701-7713, effective Jan. 1, 2004, 18 pages.
(Continued)

*Primary Examiner* — Eric Nilsson
(74) *Attorney, Agent, or Firm* — Kilpatrick Townsend & Stockton LLP

(57) ABSTRACT

Certain embodiments involve stopping potential flagged email, such spam, before it becomes flagged email. For instance, certain embodiments can make a prediction (e.g., spam or other flagged email) about a "proposed" email message to a list of email addresses of proposed recipients. The flagged email prediction is generated based on the list of email addresses of recipients. The flagged email prediction can involve using stored data about historic email addresses, historic lists of email addresses, historic email transactions, or some combination thereof to calculate historic hard bounce rates. The historic hard bounce rates can
(Continued)

be used to train processes to calculate the hard bounce rates for the email addresses on the list and the list of email addresses.

20 Claims, 9 Drawing Sheets

Related U.S. Application Data

(60) Provisional application No. 61/800,734, filed on Mar. 15, 2013, provisional application No. 61/801,043, filed on Mar. 15, 2013.

(51) Int. Cl.
*G06N 20/00* (2019.01)
*G06Q 10/10* (2012.01)
*H04L 29/06* (2006.01)
*H04L 12/58* (2006.01)
*G06N 20/20* (2019.01)
*G06Q 30/02* (2012.01)
*H04L 29/08* (2006.01)

(52) U.S. Cl.
CPC ....... *G06Q 10/107* (2013.01); *G06Q 30/0201* (2013.01); *H04L 51/12* (2013.01); *H04L 63/14* (2013.01); *H04L 67/22* (2013.01); *G06F 2221/2101* (2013.01); *G06F 2221/2141* (2013.01)

(58) Field of Classification Search
CPC ..... G06Q 30/0201; H04L 51/12; H04L 63/14; H04L 67/22; G06F 2221/2101; G06F 2221/2141
See application file for complete search history.

(56) References Cited

U.S. PATENT DOCUMENTS

| | | | |
|---|---|---|---|
| 2008/0034432 A1* | 2/2008 | Bohannon | H04L 51/34 726/23 |
| 2008/0133682 A1 | 6/2008 | Chadwick et al. | |
| 2008/0140781 A1 | 6/2008 | Bocharov et al. | |
| 2010/0153394 A1 | 6/2010 | Wood et al. | |
| 2010/0257241 A1* | 10/2010 | Hale | G06F 15/16 709/206 |
| 2011/0258218 A1* | 10/2011 | Hayes | G06Q 10/107 707/769 |
| 2013/0325991 A1 | 12/2013 | Chambers et al. | |

OTHER PUBLICATIONS

U.S. Appl. No. 14/216,654, "Advisory Action", dated Jan. 25, 2018, 3 pages.
U.S. Appl. No. 14/216,654, "Advisory Action", dated Sep. 21, 2017, 5 pages.
U.S. Appl. No. 14/216,654, "Final Office Action", dated Apr. 20, 2017, 7 pages.
U.S. Appl. No. 14/216,654, "Non-Final Office Action", dated Sep. 1, 2016, 34 pages.
U.S. Appl. No. 14/216,654, "Notice of Allowance", dated Mar. 29, 2018, 8 pages.
Debarr et al., "Spam detection using clustering, random forests, and active learning", Sixth Conference on Email and Anti-Spam. Mountain View, California, 2009, 3 pages.
Georgieva, "An Introduction to Email Marketing", retrieved from the internet. [retrieved Aug. 25, 2016 URL<http://cache. winntech. net/docs/ebooks/ An-Introduction-to- Email-Marketing .pdf>], 2012, 52 pages.

* cited by examiner

AUTOMATICALLY PREDICTING THAT A PROPOSED ELECTRONIC MESSAGE IS FLAGGED BASED ON A PREDICTED HARD BOUNCE RATE

CROSS REFERENCE TO RELATED APPLICATIONS

This disclosure is a continuation of U.S. patent application Ser. No. 14/216,654, filed Mar. 17, 2014 and is hereby incorporated in its entirety by this reference, which claims the benefit of priority of U.S. Provisional Application No. 61/800,734 filed on Mar. 15, 2013 and U.S. Provisional Application No. 61/801,043 filed on Mar. 15, 2013, each of which is hereby incorporated in its entirety by this reference.

TECHNICAL FIELD

This disclosure generally relates to electronic communications, and more particularly, relates to classifying electronic content as potential flagged electronic messages and, in some cases, selectively preventing the transmission of flagged electronic messages.

BACKGROUND

Flagged email, such as spam is unsolicited electronic mail communications typically for some dubious product or service or other undesirable reason. A sender may flood the Internet with spam emails, all having the same message in an attempt to force that message on people who would not otherwise choose to receive it.

As the email version of the junk mail that arrives unsolicited in a person's U.S. Postal Service mailbox, spam is considered annoying and a time waster by many at least because spam may clutter up a person's email inbox. In addition, spam may be considered offensive to some, especially when spam promotes adult subject matter such as sexual products or services. Spam may be a danger to the gullible with offers of get-rich quick schemes or quasi-legal offers.

Spam costs consumers in terms of lost productivity and fraud. Spam costs Internet Service Providers (ISPs) money at least because ISPs have had to add extra capacity to cope with the deluge of spam, and have had to divert employees' time to dealing with the spam. ISP employees also have had to manage complaints from customers who receive spam and assume that the ISP is in league with the spammer. Spam and other flagged email be sent with minimal operating resources, which can increase the difficulty of its prevention.

Experts have designed ways to filter out spam. A typical spam filter may look at a long list of criteria to judge whether or not an email received from a sender is spam. A spam filter may look for "spammy" phrases like "CLICK HERE!" or "FREE! BUY NOW!" The spam filter may assign a point value each time it sees such a phrase in an email received from a sender. If the email's "spam score" exceeds a threshold, generally, the spam filter determines the email is spam. Based on that determination, action may be taken depending on whether the recipient is a person or an ISP. A person's email program typically contains a spam filter or "junk" evaluator. Emails the person receives that are determined to be spam may be sent to a junk.

Some spam emails do not reach the intended recipient, but instead are blocked by the spam filter(s) used by the recipient's ISP. See Chadwick et al., United States Patent Publication No. US 2008/0133682 A1, Publication Date Jun. 5, 2008 entitled Mail Server Probability Spam Filter, which is incorporated herein by reference. See also Wood, United States Patent Publication No. US 2010/0153394 A1, Publication Date Jun. 17, 2010 entitled Method and Apparatus for Reclassifying E-Mail or Modifying a Spam Filter Based on User' Input, which also is incorporated herein by reference.

An ISP that repeatedly receives spam from a particular sender of email may refuse to transmit additional emails from that sender. The ISP may implement its refusal by blocking the Internet Protocol (IP) address used by the sender.

An email (marketing) service provider (ESP) is a company, which offers email marketing or bulk mail services to its customers (also referred to as users). A client of an ESP may provide a list of email addresses to the ESP to use for distribution of an email typically authored by the client. For example, an organization may use an ESP to send an email containing the organization's newsletter to a list of email addresses provided by the organization. The transmission of the email including the newsletter may be referred to as an email campaign. Emails in a campaign originate from an IP address of the ESP, not an email address of the ESP's client. An ESP may use the same IP address for more than one of its customers and/or for more than one campaign.

Given that the ESP's IP address is seen as the origination of an email in a campaign, if the email is determined to be spam, an email may be blocked from reaching the recipient. For example, an ISP receiving an email it considers spam may divert that email from reaching the recipient. The ISP may note the originating IP address of that spam email. If the ISP continues to receive emails from that particular IP address that the ISP considers spam, the ISP may block all further emails from that IP address.

The blocking of an ESP's IP address used by an ISP is problematic, to say the least, for the ESP. As noted, an ESP may use a single IP address for more than one client. If an ISP blocks an ESP's IP address on the basis of a single customer's email campaign being spam, the ISP also blocks the further transmission of email campaigns of the ESP's other customers whose campaigns share the same IP address. In other words, legitimate email campaigns may be blocked due to the ISP's determination that some email originating from a common IP address constitutes spam.

Obviously, the failure of an email campaign to be delivered to intended recipients may reflect badly on the ESP in the eyes of its clients. Users who mount email campaigns want the emails delivered, not blocked. Even if the ESP scrambles to carry out the legitimate email campaigns by using an unblocked IP address, time is wasted, resources are taxed, and frustration mounts. A client may decide to switch its email campaign business to a different ESP.

Besides simply losing business and a good reputation with customers, an ESP may fall into disrepute with an ISP if the ESP repeatedly transmits spam. The ISP may note the identity of the ESP that sent the spam and recall the spam incident when future communications are called into question. The ISP may share its bad opinion of the ESP with other ISPS. An ESP with a poor reputation may not be able to work with ISPs who only service ESPs of good reputation. That may severely restrict an ESP's ability to carry out its services for clients, and may eventually, put an ESP out of business.

To avoid the problems resulting from the transmission of spam, many ESPs employ their own spam filters. For example, upon receipt of an email from a customer for a campaign, an ESP may vet the email through a spam filter. If the ESP finds that the email constitutes spam, the ESP may inform the customer, request that the customer change the email, or even refuse to send the email.

Whether used by a recipient's email program, an ISP, or an ESP, spam filters generally are effective at catching "obvious" spam such as email containing "spammy" phrases like "CLICK HERE!" or "FREE! BUY NOW!" As spammers come up with every more creative ways of communicating about the drug sildenafil citrate, sold as VIAGRA®, spam filters continue evolve to keep up with that creativeness.

But spam filters typically are less effective at predicting permission issues. Recall that spam is defined as unsolicited email. Thus, a conventional spam filter may determine that an email including the word "FREE!" in the subject line is spam, but be wrong in that determination because the recipient has signed up for that email.

Another problem with conventional spam filters is that they may be effective at catching spam with "spammy" phrases, but emails without such obvious characteristics may constitute spam as being unsolicited by the recipients. An example of such a problem is a real-estate agent, who copies all of the email addresses out of a neighborhood's address book and sends an email campaign marketing his or her real estate services to those addresses. The real-estate agent's campaign email may avoid the spam filters by failing to include "spammy" words, but the campaign email, nonetheless, is unsolicited and spam in the problem presented.

Yet another problem with conventional spam filters is that they typically have a difficult time in detecting "ignorant" spammers. An example of an "ignorant" spammer is a business owner who sends an unsolicited email "blast" to an email list that he or she obtained at a tradeshow. In a similar fashion, conventional spam filters may have a difficult time in detecting spam from previous bona fide email senders who deliberately or by mistake send out spam. For example, a business may have a lackluster sales period. To boost sales, the business may resort to sending spam. As another example, a business may desire to escalate its marketing by sending an email campaign to as many recipients as possible and may take inappropriate shortcuts by not obtaining permission from all of the recipients. And there are businesses that run legitimate email campaigns but occasionally mistakenly include email addresses of unsolicited recipients.

Another viewpoint with respect to spam is its place in the overall email communications network or "email ecosphere". If legitimate emails are considered the vehicles on the information highway, spam may be the litter that trashes that highway. Legitimate emails are delivered, but their path is strewn with spam detritus. Spam sullies the email ecosphere.

Even though an ISP or an ESP may use one or more filters to avoid sending spam, and those spam filters continue to evolve to keep up with spammers, the ISP and the ESP may continue to innocently transmit spam. Thus, there is a need for a way to find spam before it is transmitted into the email ecosphere so that ecosphere may not be further sullied, so that ISPs and ESPs may not have to divert resources to fighting spam, so that IP addresses used by ESPs are not blocked by ISPs based on perceived spam, and so that consumers are not be deluged by unwanted emails.

SUMMARY

Certain embodiments involve stopping potential flagged email, such spam, before it becomes flagged email. For instance, certain embodiments can make a prediction (e.g., spam or other flagged email) about a "proposed" email message to a list of email addresses of proposed recipients. The flagged email prediction is generated based on the list of email addresses of recipients. The flagged email prediction can involve using stored data about historic email addresses, historic lists of email addresses, historic email transactions, or some combination thereof to calculate historic hard bounce rates. The historic hard bounce rates can be used to train processes to calculate the hard bounce rates for the email addresses on the list and the list of email addresses.

DETAILED DESCRIPTION

Figure 1:
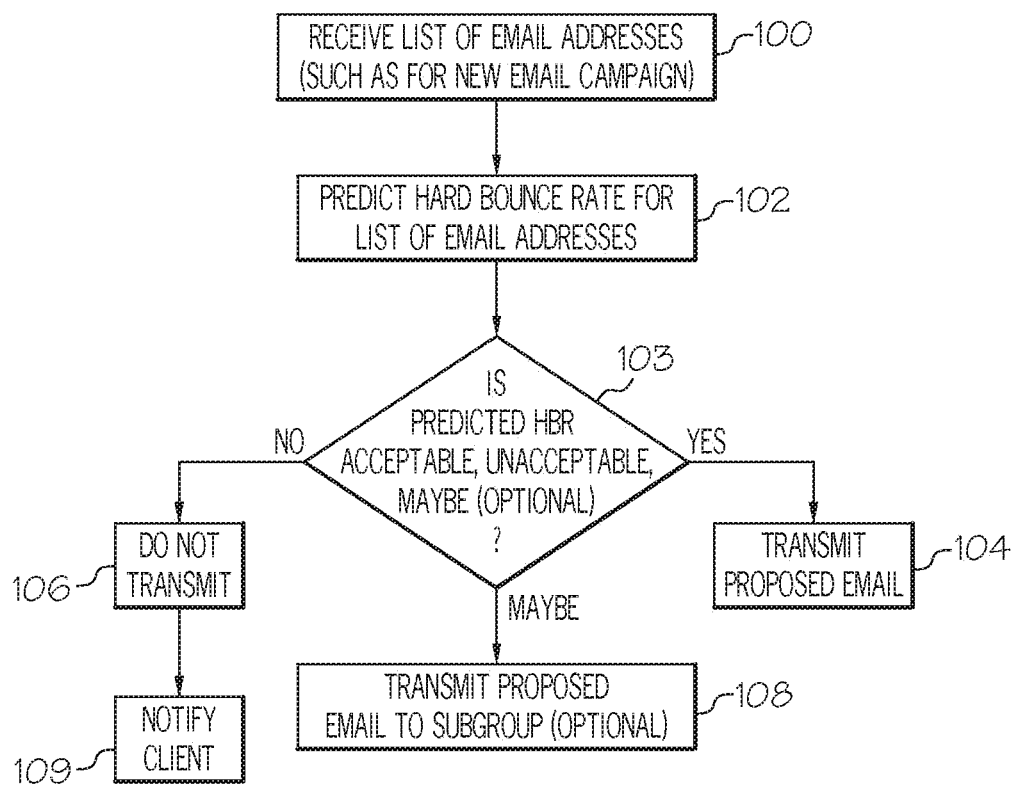
FIG. 1 is a flow diagram of certain embodiments.

Certain embodiments involve stopping flagged email, such spam, before it becomes flagged email. These embodiments can predict whether a "proposed" electronic mail (email) communication is flagged email. For instance, certain embodiments can make a prediction (e.g., spam or other flagged email) about a "proposed" email message to a list of email addresses of proposed recipients. The proposed email message has not been transmitted prior to the flagged email prediction. The flagged email prediction is based on the list of email addresses of recipients, not the proposed email message. The flagged email prediction can involve using stored data about historic email addresses, historic lists of email addresses, historic email transactions, or some combination thereof to calculate historic hard bounce rates. The historic hard bounce rates can be used to train processes to calculate the hard bounce rates for the email addresses on the list and the list of email addresses.

In some embodiments, if the calculated hard bounce rate for the list of email addresses provided by the sender is above a threshold, the email is predicted to be flagged email. In additional or alternative embodiments, an additional process may be included prior to the prediction of an email being flagged email. The list of email addresses may be compared to one or more lists of email addresses that have been purchased and/or otherwise to be indicators of flagged email to see if there is a match. Appropriate action such as contacting the sender with an alert to the probable flagged email may be taken.

Advantageously, certain embodiments predict whether a proposed electronic mail (email) communication is spam. If the proposed email communication is predicted to be spam, it is not transmitted. Thus, the exemplary embodiments stop spam before it actually becomes spam. An email communication also may be referred to herein as an "email message," "email", or "message".

Generally stated, the exemplary embodiments make a spam prediction about a "proposed" email message to a list of email addresses of proposed recipients. It is important to note that the proposed email message has not been transmitted prior to the spam prediction. The creator of the proposed email message submits it with a list of email addresses for proposed recipients. The spam prediction is based on the list of email addresses of recipients, not the proposed email message. Herein, the phrase "list of email addresses" is used synonymously with "list of email addresses of proposed recipients" unless noted otherwise.

As noted, certain embodiments predict whether a proposed email communication is spam based on the email addresses of the proposed recipients. The exemplary embodiments predict spam by predicting a hard bounce rate (HBR) for the recipients' email addresses. A hard bounce is an email message that has been returned to the sender as undeliverable. Causes of a hard bounce may include an invalid email address (domain name does not exist, typographical error, etc.), or the email recipient's mail server blocking of the sender's server. A hard bounce rate (HBR) is a calculation of the percentage of transmitted email messages that suffer a hard bounce as compared to the total of transmitted email messages. A hard bounce rate may be calculated with respect an email address, or for multiple email addresses such as occur in a list of email addresses.

The exemplary embodiments predict the hard bounce rate of a list of email addresses associated with a proposed email message. The hard bounce rate is based on profile data of the email addresses in the list. If the predicted hard bounce rate exceeds an unacceptable threshold, the proposed email message associated with the list of email addresses is rejected before the proposed email message is transmitted. It is rejected because it is predicted to be spam. If the predicted hard bounce rate falls below an acceptable threshold, the proposed email communication is transmitted because it is predicted to not be spam. In some embodiments, there may be a range between the acceptable threshold for a predicted hard bounce rate and the unacceptable threshold. If the predicted hard bounce rate falls within the range, the proposed email communication may be transmitted to a subgroup of the email addresses on the list of email addresses as a "taste-test" to see what happens. Whether the email communication is transmitted to the remainder of the email addresses on the list of email addresses depends on the results of the transmission to the sub-group of email addresses.

An overview of certain embodiments may be gained by reference to FIG. 1. In action 100, the entity that is to send the proposed email communication receives a list of email addresses for proposed recipients. For example, an email service provider (ESP) may receive a list of email addresses from a customer of the ESP. The customer instructs the ESP to send a proposed email communication to the recipients based on the list of email addresses. Rather than provide a list of email addresses, the customer of the ESP may designate the list of email addresses such as in the case when the customer has previously provided the list of email addresses to the ESP. Thus, it does not matter how the ESP obtains the list of email addresses, but that the ESP operates on the premise that the customer has instructed the ESP to send a proposed email message to the list of email addresses. The same applies when the customer and the ESP are respectively different types of entities.

In action 102 of FIG. 1, the entity predicts the hard bounce rate ("HBR") for the proposed email based on the list of email addresses. In action 103, the entity checks whether the predicted HBR is acceptable, or unacceptable. If the predicted HBR is acceptable, then the entity transmits the proposed email to the list of email addresses in action 104. If the predicted HBR is unacceptable, then the entity does not transmit the proposed email to the list of email addresses.

FIG. 1 includes the optional action 103 of determining whether the predicted HBR falls into a range between acceptable and unacceptable, which is referred to as the "maybe" range. FIG. 1 also shows the optional action 108 that transmits the proposed email to a subgroup of email addresses on the list of email addresses if the predicted HBR falls within the "maybe" range.

The exemplar embodiment gives the predicted HBR for the list of email addresses a score from 0-1 (continuous) where 1 is the worst score and 0 is the best score. In other words, a score of 1 represents a prediction of 100% hard bounce rate. A score of 0.6 for a HBR predicts a 60% hard bounce rate. This type of scoring may be referred to as "class probability".

Figure 2:
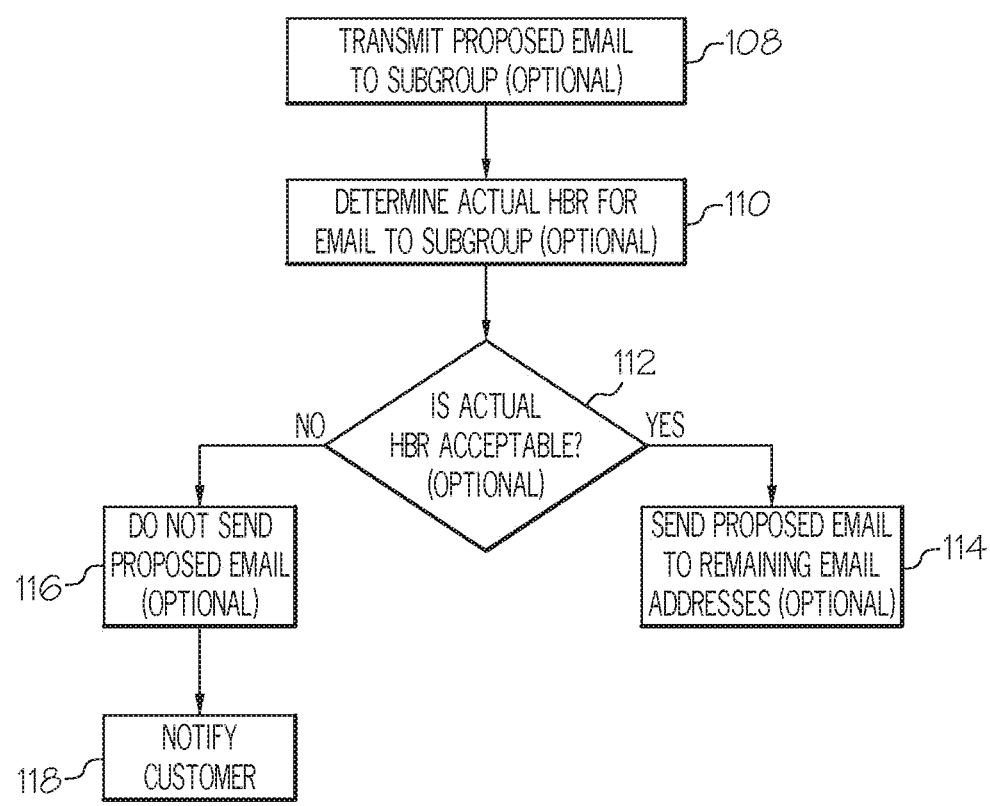
FIG. 2 is a flow diagram of an optional process that may be performed by certain embodiments.

FIG. 2 includes additional optional actions 110, 112, 114, 116, and 118 relating to the optional action 108 from FIG. 1 of transmitting the proposed email to a subgroup of email addresses in the list of email addresses. In action 110, an actual HBR is determined for the email message sent to the subgroup of email address on the list of email addresses. If action 112 determines that the actual HBR is acceptable (such as by falling below a predetermined threshold or otherwise), then in action 114 the proposed email is transmitted to the remaining email addresses on the list of email addresses. If action 112 determines that the actual HBR is unacceptable (such as by being above a predetermine threshold or otherwise), then in action 116 the proposed email is not sent to the remaining email addresses on the list, and in action 118, the embodiment may notify the customer of the action of not sending the proposed email.

Alternatively, an embodiment instead may send the proposed email message to a second subgroup of the list of email addresses and repeat action 112 to determine if the actual HBR for the email message sent to the second subgroup is acceptable or not. The alternative of sending to another sub-group of the list of email addresses may continue until there are no additional sub-groups.

More particularly, there are entities that have access to a lot of information or data about email communications. By the nature of the services it provides, an email service provider (ESP) is such an entity. With regard to this invention, the term "email service provider" refers to an entity that sends bulk (volume) email on behalf of its clients and/or that facilitates email marketing for clients. An ESP also may be referred to as an email broadcast service provider or an ESP (marketing). Even though the exemplary embodiments are described with respect to an ESP, the invention is not to be limited to ESPs.

An ESP has customers on whose behalf the ESP may conduct email campaigns. An email campaign is a service that the ESP provides a customer generally in return for payment. As part of an email campaign, the customer may provide the ESP with an email communication and a list of email addresses to which the email communication is to be sent. In some instances, the customer may not provide the ESP with the email communication, but may choose an email communication from email communications made available by the ESP, authored by other entities, etc.

Through the course of conducting many email campaigns on behalf of many customers, an ESP may store and have ready access to a vast amount of data on email campaigns. As part of the stored data on email campaigns, the ESP may store and may have access to a vast amount of profile data relating to the email addresses of recipients of the campaigns. The profile data relating to an email address may include various features. One group of features is referred to herein as "domain features", which may include data related to the domain part of the email address, e.g. "gmail.com". Another group of features is referred to herein as the "address features", which may include subgroups of features such as "send address features", "constituent address features", and "public address features". As used herein, "Recent activity address features" is another group of features that may be included in profile data relating to an email address. The "recent activity address features" may include the subgroup of "last time address features," and "next to last time address features." A "feature" also may be referred to herein as a "factor".

Particular information about various features of profile data relating to an email address is now provided in summary form.

Domain Factors include:
domain—the domain portion of an email address, e.g. "gmail.com";
domain_total_attempts 30 days—the number of times an email service provider tried to send to the domain in the last 30 days;
domain_perc_success—the percentage of successful attempts in sending to the domain;
;
domain_perc_hard_bounce—the percentage of attempts in sending to the domain that hard-bounced, e.g. no such mailbox;
domain_perc_soft_bounce—the percentage of attempts in sending to the domain that soft-bounced, e.g. mailbox full;
tld—the top-level domain portion of the email address, e.g. ".com"; and
valid_mx—whether or not the domain has a valid MX DNS record, i.e. can the email service provider find a mail server to communicate with for that domain Email Address Factors.

"Send" email address factors include:
n_attempts.sub.—180d—the number of times the email service provider tried to send to the email address in the last 180 day;
n_attempts_total—the number of times the email service provider has tried to send to the email address since the beginning of time;
n_bounces_hard.sub.—180d—the number of times the email service provider received a hard bounce when sending to the email address in the last 180 days;
n_bounces_hard_total—the number of times the email service provider received a hard bounce when sending to the email address since the beginning of time;
n_bounces_soft.sub.—180d—the number of times the email service provider received a soft bounce when sending to the email address in the last 180 days;
n_bounces_soft_total—the number of times the email service provider received a soft bounce when sending to the email address since the beginning of time;
n_sends.sub.—180d—the number of times the email service provider successfully sent to the email address in the last 180 days; and
n_sends_total—the number of times the email service provider successfully sent to the email address since the beginning of time.

"Constituent" email address features include
local_part_length—the number of characters in the local part of the email address (before @);
length—the total number of characters in the email address;
starts_numeric—whether the email address starts with a digit;
local_part all numeric—whether the local part of the email address is all digits;
local_part max qwerty dist—the maximum distance in keys on the keyboard between any two letters in the email address;
n_special_chars_common—the number of "common" characters in the email address;
n_special_chars_unrestricted—the number of "unrestricted" characters in the email address;
n_special_chars_restricted—the number of "restricted" characters in the email address; and
n_special_chars_non_ascii—the number of non-ASCII characters in the email address.

"Public" Email Address Features
is_public—whether the email address is publicly available in some way;
n_public_lists—the number of public lists on which the email address was found (the sum of the following 5 counts);
n_purchased_lists—the number of purchased lists on which the email address was found;
n_scraped_lists—the number of scraped lists on which the email address was found;
n_stolen_lists—the number of stolen lists (a la Gawker) on which the email address was found;
n_shutdown_lists—the number of shut-down the email service provider's accounts in which the email address is found; and
n_coreg_lists—the number of coregistration lists on which the email address was found.

"Recent Activity" email address features include "Last Time" email address features, "Next-to-Last Time" email address features, and "Second-Next-to-Last Time" email address features.

"Last Time" email address features include:
event0_type—what happened (send/hard bounce/soft bounce) the last time the email service provider tried to send to the address (most recent event);
event0_bt_code—the BoogieTools code for the most recent event;
event0_age—the age of the most recent event; and
event0_delta—the amount of time elapsed since the event previous to the most recent event.

"Next-to-Last Time" email address features include:
event1_type—what happened (send/hard bounce/soft bounce) the next-to-last time the email service provider tried to send to the address;
event1_bt_code—the BoogieTools code for the next-to-last event;
event1_age—the age of the next-to-last event; and
event1_delta—the amount of time elapsed since the event previous to the most recent event.

"Second-Next-to-Last Time" email address features include:
event1_type—what happened (send/hard bounce/soft bounce) the second-next-to-last time the email service provider tried to send to the address;

event2_bt_code—the BoogieTools code for the second-next-to-last event; and event2_age—the age of the second-next-to-last event.

The above listed features of profile data are used in certain embodiments. Other embodiments may employ fewer features of profile data, more features, and/or different features.

Figure 3:
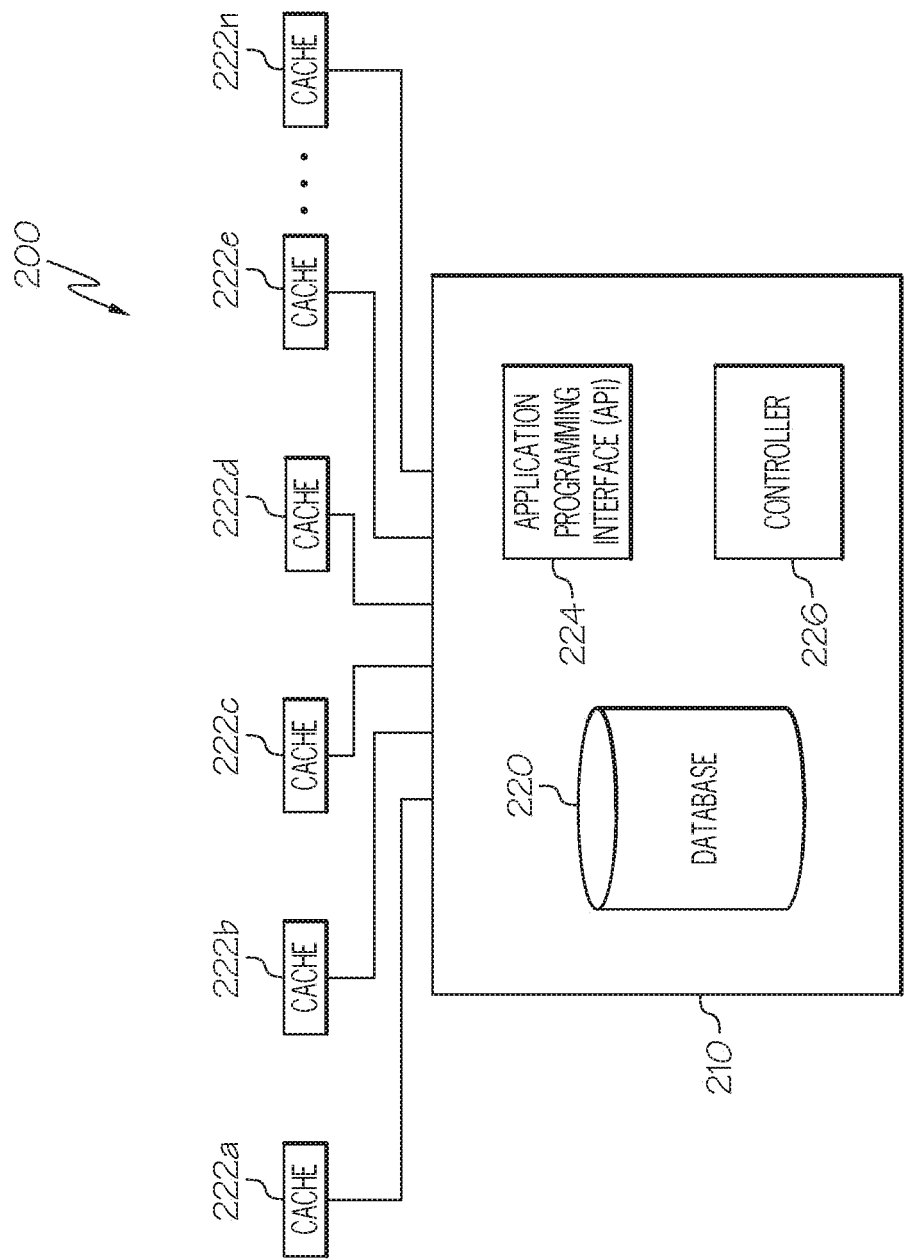
FIG. 3 is a block diagram of an example of an environment for certain embodiments.

FIG. 3 is a block diagram illustrating an exemplary system 200 that may be used in whole or in part by the exemplary ESP in predicting the hard bounce rate of a list of email addresses. Within subsystem 210, FIG. 3 illustrates database 220 for storing data about email campaigns and email addresses. In the exemplary embodiment, the database 220 is a PostgreSQL open source object-relational database management system. "PostgreSQL" is also referred to as "Postgres". Unless specifically noted herein, the terms "database" and "database system" are used interchangeably. Information about the PostgreSQL system database may be obtained from http://www.postgresql.org/ or The PostgreSQL Global Development Group.

In addition, the exemplary ESP stores data about email addresses and email campaigns in caches 222a-n, which are communicatively connected to subsystem 210 and database 220. FIG. 3 shows that the exemplary ESP employs six caches 222a-n, but the number may vary depending on the size of the email data, limitations of the individual caches, rate of accumulation of email data, and/or for other reasons. The caches 222a-n in the exemplary embodiment are or may include Redis data structure servers. Redis is an open-source, networked, in-memory, key-value data store with optional durability. Information about the Redis data store is available at http://redis.io/. Redis works with an in-memory dataset.

The use of the Redis caches 222a-n with the PostgreSQL database management system 220 is advantageous at least with respect to the exemplary embodiment. The Redis caches 222a-n allow for quick return of stored profile data relating to email addresses and email campaigns when such data is requested.

FIG. 3 also illustrates that subsystem 210 may include an application program interface (API) and a controller 226 in performing certain embodiments. The relationships among elements in FIG. 3 are examples of implementation of a particular embodiment. System 200 may include more or fewer elements as appropriate to performing the embodiments. System 200 may be in communication with other system(s) of the ESP including communications through a global network such as the Internet. Sub-system 210 may be configured differently in other embodiments as well. For example, controller 226 may be a part of another subsystem of the ESP, may control other sub-systems, etc.

Figure 4:
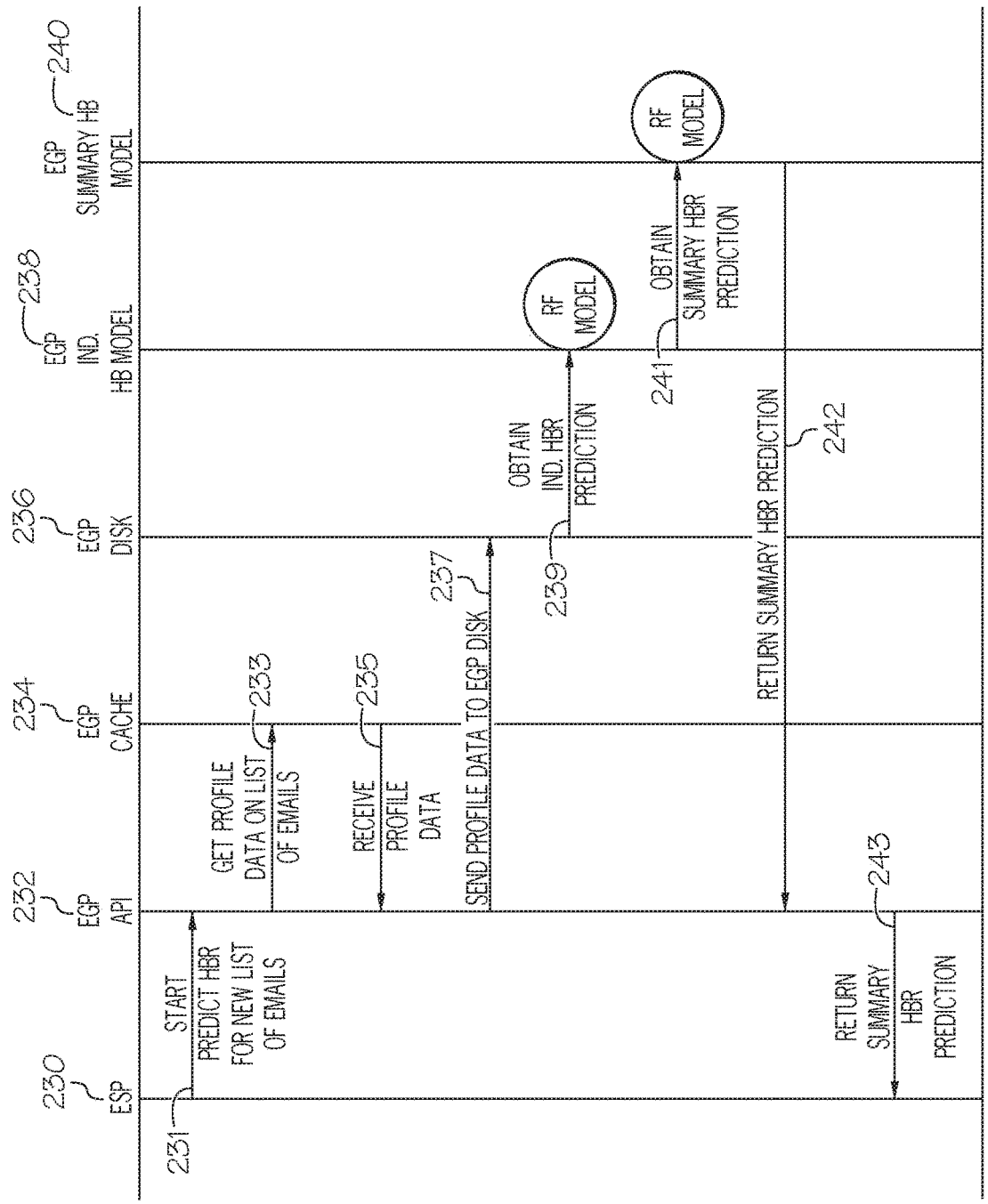
FIG. 4 is a chart of elements and actions that may be involved in performing certain embodiments.

FIG. 4 is a chart providing a summary of how the exemplary ESP predicts that a proposed email is spam by predicting the hard bounce rate (HBR) for the list of email addresses to which the proposed email is to be sent. FIG. 4 illustrates certain embodiments by showing elements and actions as performed to make the HBR for the list of email addresses.

ESP 230 may receive an instruction from a customer to mount an email campaign. The customer provides the proposed email and list of email addresses for the email campaign. As previously noted, the customer may instruct the ESP 230 to use a previously used list of email addresses for the campaign. ESP 230 starts the HBR prediction process in action 231 by contacting the appropriate application-programming interface (API). In this embodiment, the API is designated as an "EGP" API 232. The "EGP" refers to "Email Genome Project". In action 233, the EGP API requests the profile data for the list of emails for the proposed email campaign from EGP cache 234 and receives the profile data from the EGP cache 234 in action 235.

In action 237, the EGP API sends the obtained profile data to the EGP Disk 236. It represents interaction that may occur between or among the database 220, controller 226, and caches 222a-n (discussed above in connection with FIG. 3) to bring about the actions shown in FIG. 4.

In action 239, the EGP disk 236 obtains a hard bounce prediction for each of the email addresses in the list of email addresses. The HBR prediction is obtained by use of an individual EGP hard bounce model 238 through the use of a Random Forest ensemble method, which is discussed below in connection with FIGS. 5-6. The "Random Forest ensemble method" also may be referred to herein as the "Random Forest Model" or "RF Model." The "HBR prediction" for an email on the list of email addresses also may be referred to herein as the "individual HBR prediction".

In action 241, the HBR predictions for each of the email addresses in the list of email addresses are used to obtain the summary HBR prediction with respect to the list of email addresses, rather than individual email addresses. The summary HBR prediction is obtained by use of a summary EGP hard bounce model 240 through the use of a Random Forest ensemble method, which is discussed below in connection with FIGS. 7-8.

In action 242, the summary HBR prediction is returned to the EGP API 232, which in turn, returns the summary HBR prediction to the ESP in action 243. As noted previously, the ESP may take action or not regarding the proposed email campaign depending on the summary HBR prediction.

An explanation is now provided of how the predicted HBR for each email address in the list of email addresses for a proposed email campaign is determined. As mentioned above, the predicted individual HBRs are used to determine the predicted HBR for the list of email addresses, which in turn, determines whether the proposed email for the campaign is spam.

A predicted HBR for each email address is determined by using the profile data obtained for that email address. The profile data for an email address is used in an algorithm to induce a Random Forest model. A Random Forest model is an ensemble learning method or framework for classification and regression that operates by constructing a multitude of decision trees at training time and outputting the class that is the mode of the classes output by the individual trees.

Figure 5:
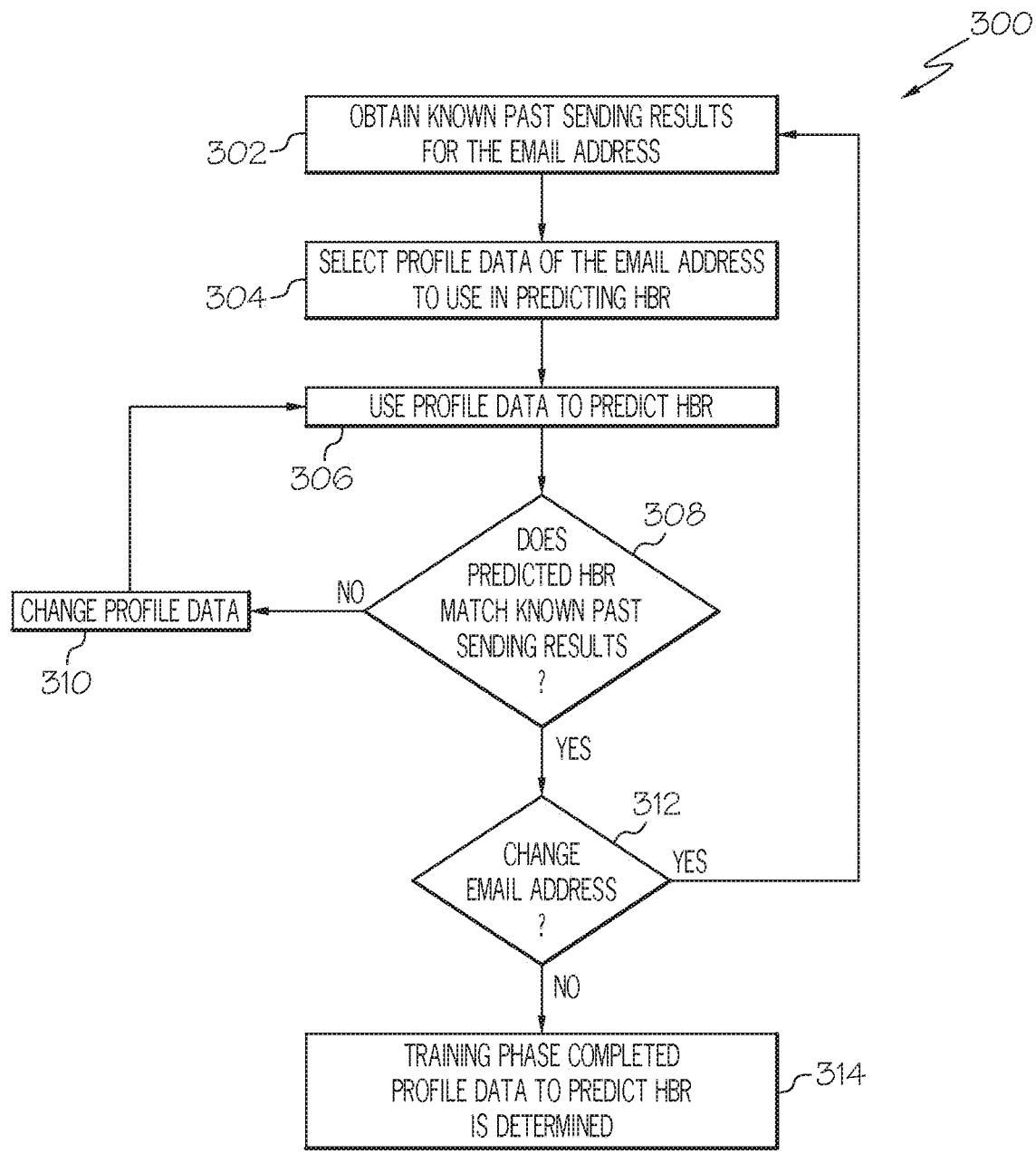
FIG. 5 is a flow diagram of selection actions that may be taken by certain embodiments.

Before the RF model may be used to determine a predicted HBR for an email address, the RF model must be trained. FIG. 5 is a flow diagram of the training phase as may be used in the exemplary embodiment. Other embodiments may vary.

In action 302, "known past sending results" or "KPSR" are obtained for an email address. The exemplary embodiment may obtain this KPSR from its stored data in the database 220 and/or in the caches 222a-n shown in FIG. 3. For example, the exemplary embodiment may review its stored information on previous email campaigns and how the addresses in those campaigns performed. An email address may have hard bounced when it was sent an email newsletter three months ago, but on the three "sends" (emails to the email address) prior to the hard bounce, the email address may have received the three emails. Such history is used in the training process (also referred to as training record) for predicting the HBR for the email address.

Referring to FIG. 5, in action 304, profile data of the email address is selected to use in predicting the HBR. The features making up the profile data in the exemplary embodiment are listed above. In action 306, the profile data is used to predict the HBR. In action 308, the predicted HBR is compared to the KPSR. If the predicted HBR does not match the KPSR, the profile data may be changed in action 310. Profile data may be changed in any appropriate manner so as to train the RF model. The exemplary embodiment returns to action 306 to use the changed profile data to predict the HBR. The loop continues until there is a match between the predicted HBR and the KPSR, which indicates the RF model has been trained.

If a match is found between the predicted HBR and the KPSR, then in action 312 the exemplary embodiment may determine that the RF model is trained for the subject email address and move on in action 312 to see if another email address is to be used for training. If so, then the exemplary embodiment returns to action 302 to obtain KPSR for the new email address. If the exemplary embodiment in action 312 determines that there is no need to change to a new email address, (for example, the list of email addresses may be exhausted), then in action 314 the exemplary embodiment considers the training phase completed. The profile data to predict HBR for a particular email address is considered to be determined. At the end of this training, the result is a "Random Forest" (RF) model, which is a type of artificial intelligence model or machine learning model. An RF model may be considered an artificial brain in that it is a set of experiences that have been distilled down into logic or rules. In the case of the RF model, the training examples are distilled down into nest rules that form "decisions trees".

Figure 6:
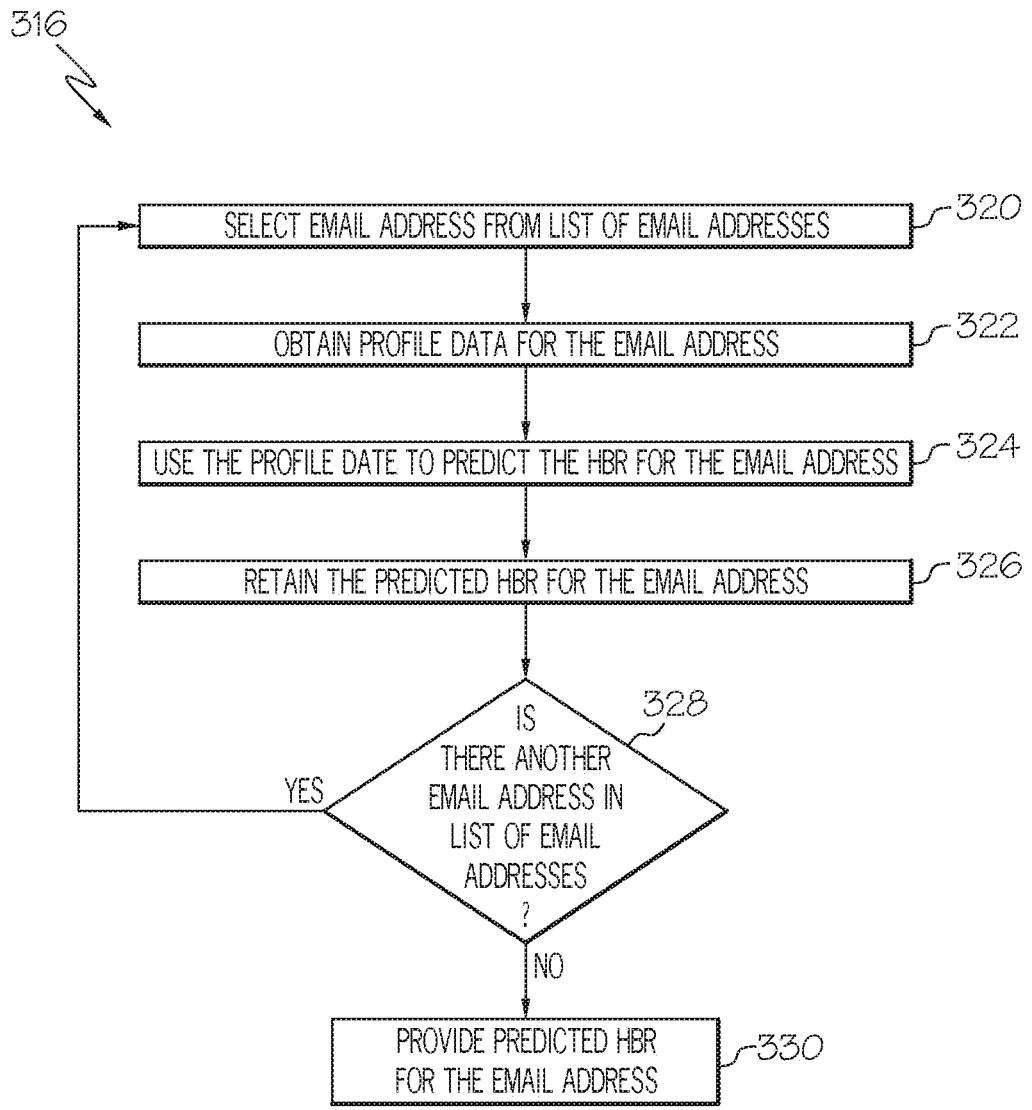
FIG. 6 is a flow diagram of selection actions that may be taken by certain embodiments.

FIG. 6 is a flow diagram 316 of the process of predicting the HBR of an email address when the RF model is trained. This process may be referred to as the "production" use of predicting the HBR for the individual email address. In action 320, the email address for HBR prediction is selected from the list of email addresses for the email campaign. The profile data that was determined during the training phase of the process for use in the production phase is obtained for the subject email in action 322. The obtained profile data in action 324 is used to predict the HBR for the email address using the trained RF model. At this point in the process, as shown in action 326, the exemplary embodiment may retain or store the predicted HBR email address such as for use in predicting the HBR for the list of addresses.

In action 328, the exemplary embodiment may check to see if another email address is to be run through the process. If so, then the exemplary embodiment returns to action 320 to obtain another email to run through the process. Otherwise, the exemplary embodiment may provide the predicted HBR for the email address for further use in predicting the HBR for the list of email addresses.

Figure 7:
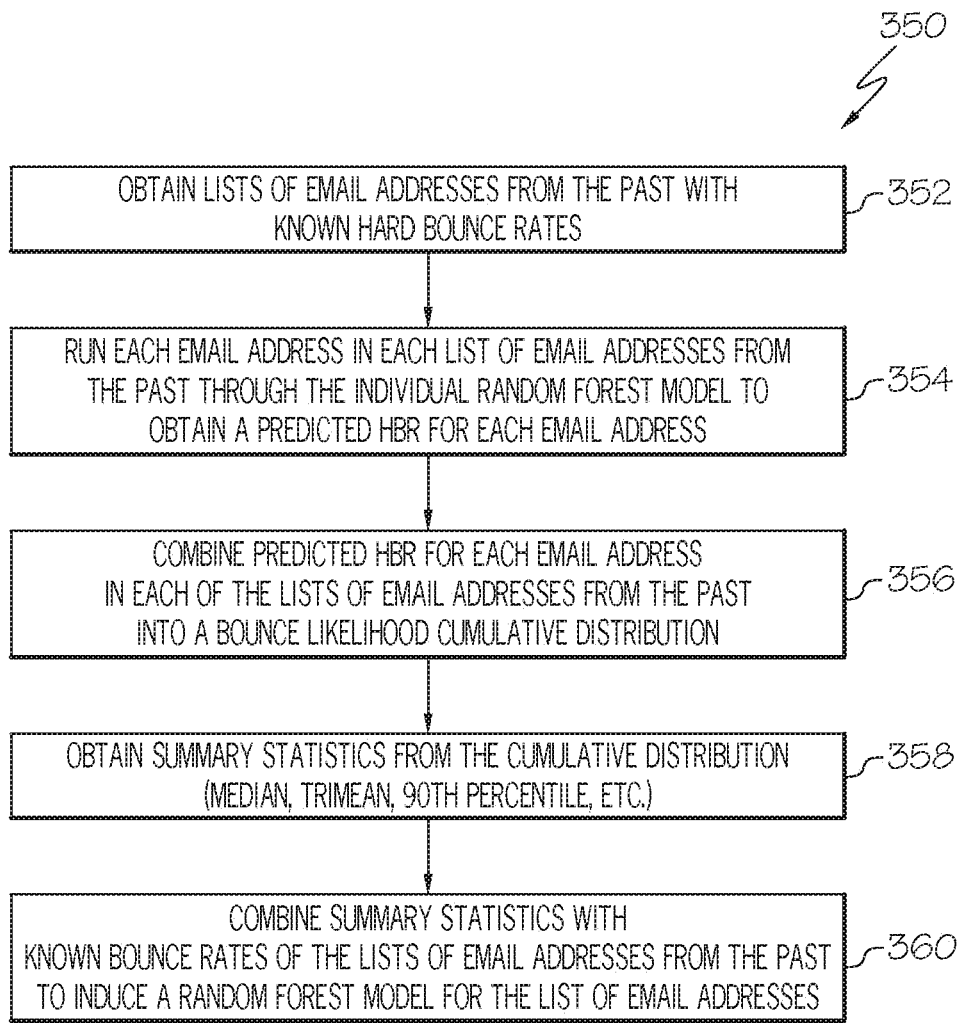
FIG. 7 is a flow diagram of selection actions that may be taken by certain embodiments.

FIG. 7 is a flow chart 350 for the training phase of a List Level Random Forest RF) model. In action 352, lists of email addresses from past email campaigns (or other lists of email addresses) are obtained. These lists also may be referred to as "historic lists". The list HBR is known for each of these lists from the historical data saved and stored about the past email campaigns. The exemplary embodiment may use about 5,000 email address lists as training lists with each containing thousands of email addresses.

In action 354, each email in each of the historic lists is put through the production use of predicting the HBR for the individual email address. See FIG. 6. The predicted HBR for each email address in the historic lists is combined into a Bounce Likelihood Cumulative Distribution (BLCD) in action 356. The "BLCD" is also referred to as the "Cumulative Distribution." In action 358, summary statistics are obtained from the BLCD. Finally, in action 360, the summary statistics are combined with the known bounce rates of the historic lists to induce a Random Forest (RF) model for the list of email addresses designated by the customer for the email campaign.

The process of training the list level RF model is summarized as follows. Stored data including the HBR for historic lists, i.e., lists of email addresses associated with email campaigns that have transpired, is available. Historic summary statistics on the historic lists are available. The list level RF model is trained to associate the summary statistics on the historic lists with the HBR for the historic lists. When the RF model encounters a list of addresses with summary statistics that match historic summary statistics for a historic list with a known HBR, the RF model uses the known HBR as the HBR prediction for the list of email addresses under consideration.

Figure 8:
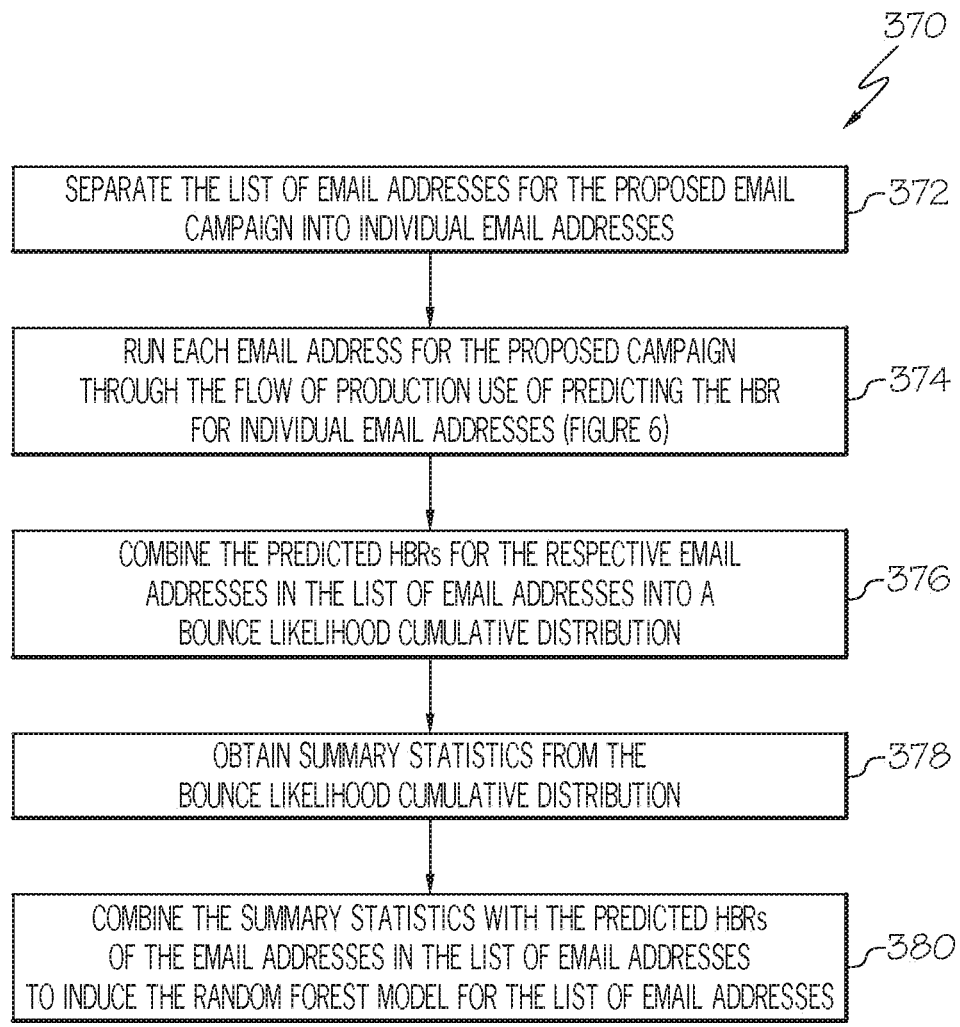
FIG. 8 is a flow diagram of selection actions that may be taken by certain embodiments.

FIG. 8 illustrates an exemplary process 370 by way of a flow diagram of the production phase of the list level RF model. In action 372, the list of email addresses for the proposed email campaign are separated into individual email addresses. They are, in action 374, each run through the flow of production use of predicting the HBR for individual email addresses discussed above in connection with FIG. 6.

In action 376, the predicted HBRs for the respective email addresses in the list of email addresses for the proposed email campaign are combined into a Bounce Likelihood Cumulative Distribution (BLCD). Summary statistics are obtained in action 378 from the BLCD. Finally, in action 380, the summary statistics are combined with the predicted HBRs of the email addresses in the list of email addresses to induce the Random Forest (RF) model for the list of email addresses.

Advantageously, the exemplary embodiment includes another process, which may aid in detecting spam before it becomes spam. The exemplary embodiment checks the list of email addresses for the proposed email campaign against lists of email addresses that have been purchased, and/or otherwise acquired ("purchased email lists"). These purchased email lists are likely to email addresses whose associated recipients have not subscribed to the purchased email list and to whom the proposed email that is part of the email campaign is spam as unsolicited email.

The exemplary embodiment may carry out the process of checking a list of email address for a proposed email campaign against purchase email lists at any appropriate time. The exemplary embodiment may carry out the list checking process after the embodiment has determined that the hard bounce rate (HBR) for the proposed email of the email campaign is acceptable. For example, the exemplary embodiment may carry out the list checking process after action 103 in FIG. 1 and before action 104 in transmitting the email.

Figure 9:
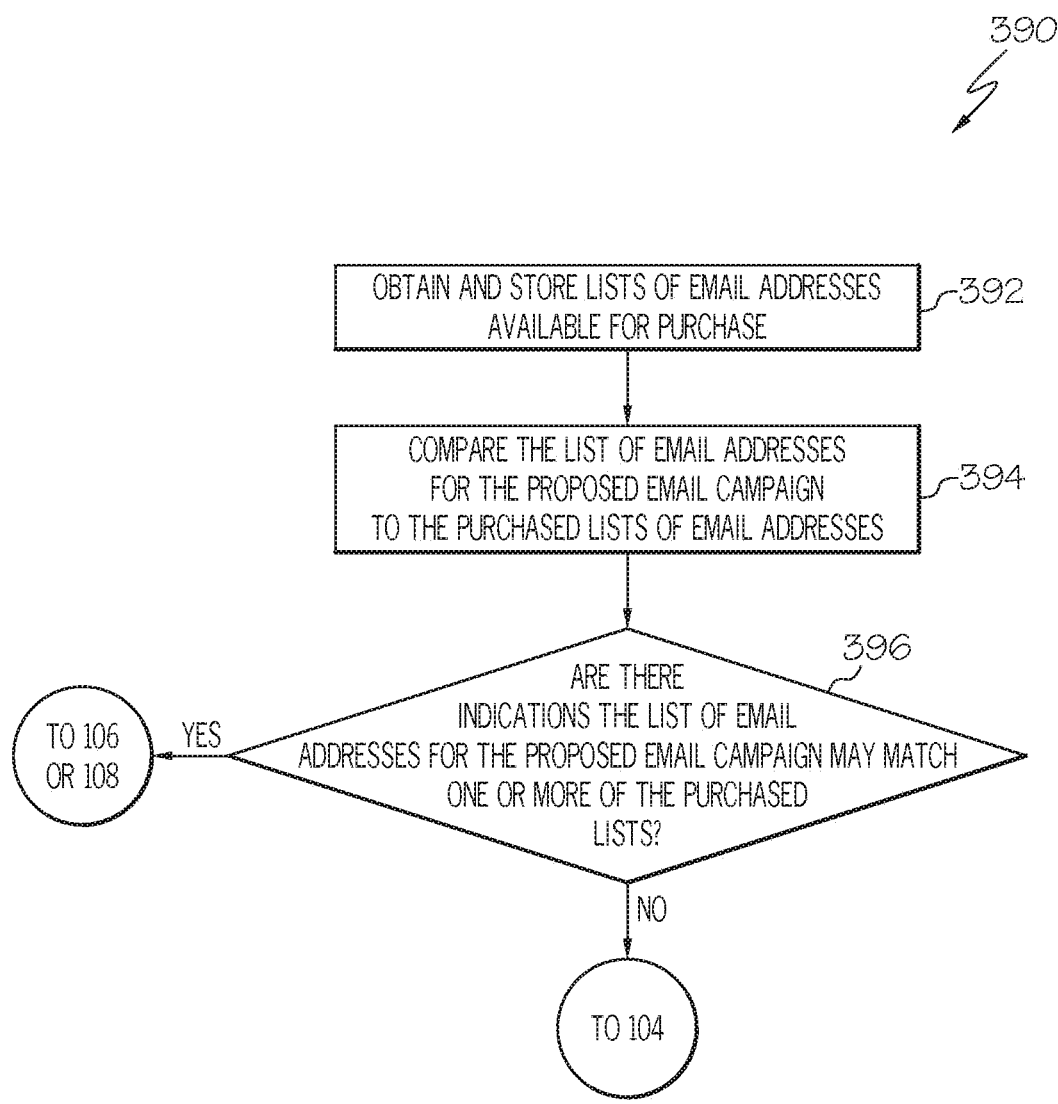
FIG. 9 is a flow diagram of selection actions that may be taken by certain embodiments.

FIG. 9 is a flow diagram illustrating an exemplary list checking process as may be used in accordance with certain embodiments. In action 392, lists of email addresses that are available are purchased and/or otherwise acquired and stored. In action 394, the list of email addresses for a proposed email campaign may be compared to the stored purchased lists. The comparison may be performed in any appropriate way. For example, the comparison may be performed email by email on the list of email addresses for the proposed email campaign.

Well-known machines or processes have not been described herein in particular detail in order to avoid unnecessarily obscuring the invention. For example, reference may be made to Wood, United States Patent Publication US 2010/0153394, published Jun. 17, 2011 for information on an exemplary computer system. For information on the infrastructure of ESPs, ISPs, and spam filters see Wood, as well as Kuhlmann et al., United States Patent Publication US 2006/0026242, published Feb. 2, 2006. Both Wood and Kuhlmann et al. are incorporated herein by reference.

In view of the foregoing, it will be understood by those skilled in the art that the systems, machines, and processes may facilitate the filtering out of spam even before it becomes spam by predicting a proposed email as spam based on a predicted HBR calculation for the list of email addresses to which the proposed email is to be sent. The above-described embodiments have been provided by way of example, and the present disclosure is not limited to these examples. Multiple variations and modifications to the disclosed embodiments will occur, to the extent not mutually exclusive, to those skilled in the art upon consideration of the foregoing description. Such variations and modifications, however, may fall well within the scope of the disclosure as set forth in the claims.

For instance, this disclosure includes various exemplary embodiments, alternative embodiments, and drawings. Various embodiments, however, may be embodied in many different forms and performed in a variety of ways that are not specifically described herein. Certain embodiments may be practiced without many of the specific details provided herein. Thus, this disclosure not to be construed as limited to the embodiments set forth in this description and/or the drawings. Unless otherwise indicated, like parts and processes are referred to with like reference numerals, and use of the singular includes the plural and vice versa.

The invention claimed is:

1. A system comprising:
a service provider computing device communicatively coupled between a sender computing system and recipient computing devices, wherein the service provider computing device is configured for executing a controller and thereby performing operations comprising:
    executing a machine learning algorithm that trains a process to predict hard bounce rates for lists of email addresses, wherein training the process to predict the hard bounce rates for the lists of email addresses comprises:
        obtaining historic lists of email addresses from past email campaigns and a historic hard bounce rate respectively associated with each list,
        determining historic individual hard bounce rates by running each historic email address on the historic lists of email addresses through an individual-bounce-rate-prediction process to predict a respective historic individual hard bounce rate for the historic email address,
        combining the historic individual hard bounce rates into a bounce likelihood cumulative distribution,
        obtaining summary statistics from the bounce likelihood cumulative distribution, and
        training a classification model to associate the summary statistics with known bounce rates of the respective historic lists, wherein the trained classification model is usable by the trained process for predicting the hard bounce rates for the lists of email addresses;
    receiving, from the sender computing system computing system and via a data network, a proposed email and a list of email addresses to be sent the proposed email;
    predicting, from the trained process, a hard bounce rate for the list of email addresses;
    determining that the hard bounce rate exceeds a threshold; and
    transmitting, based on the hard bounce rate exceeding the threshold, data to the sender computing system computing system indicating that the proposed email is a flagged email.

2. The system of claim 1, wherein predicting the hard bounce rate for the list of email addresses comprises applying the trained process to features of the email addresses, the features comprising one or more of:
    a respective number of publicly available lists on which of each email address is found;
    a respective number of purchased lists on which of each email address is found;
    a respective number of scraped lists on which of each email address is found; and
    a respective number of stolen lists on which of each email address is found.

3. The system of claim 1, further comprising an email server communicatively coupled to the recipient computing devices, the operations further comprising:
    receiving an additional proposed email from the sender computing system or an additional sender computing system;
    receiving an additional list of email addresses to be sent the additional proposed email;
    predicting, from the trained process, an additional hard bounce rate for the additional list of email addresses;
    determining that the additional hard bounce rate does not exceed the threshold; and
    configuring, based on the additional hard bounce rate not exceeding the threshold, the email server for sending the additional proposed email to the recipient computing devices.

4. The system of claim 1, further comprising an email server communicatively coupled to the recipient computing devices, the operations further comprising:
    receiving an additional proposed email from the sender computing system or an additional sender computing system;
    receiving an additional list of email addresses to be sent the additional proposed email;
    predicting, from the trained process, an additional hard bounce rate for the additional list of email addresses;
    determining that the additional hard bounce rate falls between the threshold and a lower threshold;
    configuring the email server for sending the proposed email to a subset of the recipient computing devices associated with a subset of email addresses from the list of email addresses;
    determining that a number of transmissions of the proposed email result in hard bounces; and
    transmitting, based on the determined number of transmissions exceeding a hard bounce threshold, a notification that the additional proposed email is the flagged email.

5. The system of claim 1, further comprising an email server communicatively coupled to the recipient computing devices, the operations further comprising:
    receiving an additional proposed email from the sender computing system or an additional sender computing system;
    receiving an additional list of email addresses to be sent the additional proposed email;

predicting, from the trained process, an additional hard bounce rate for the additional list of email addresses;

determining that the additional hard bounce rate falls between the threshold and a lower threshold;

configuring the email server for sending the proposed email to a subset of the recipient computing devices associated with a subset of email addresses from the list of email addresses;

determining that a number of transmissions of the proposed email result in hard bounces; and configuring, based on the number of transmissions being below a hard bounce threshold, the email server for sending the additional proposed email to additional computing devices at email addresses on the additional list of email addresses to which the additional proposed email had not been previously sent.

6. The system of claim 1, wherein predicting the hard bounce rate for the list of email addresses comprises:

determining predicted individual hard bounce rates for respective email addresses on the list of email addresses; and predicting the hard bounce rate for the list of email addresses based on the predicted individual hard bounce rates.

7. The system of claim 1, the operations further comprising training the individual-bounce-rate-prediction process, wherein training the individual-bounce-rate-prediction process comprises:

selecting training email addresses and training transmission data, wherein the training transmission data comprises, for each training email address, respective profile data describing (i) a set of characteristics of the training email address and (ii) send result data for the training email address;

accessing an address-level classification model;

iteratively modifying the address-level classification model based on the selected training email addresses and the selected training transmission data; and outputting the address-level classification model, as iteratively modified, for use in the individual-bounce-rate-prediction process.

8. A method for selectively filtering flagged electronic content at sender computing systems, wherein the method includes a service provider computing device, which is communicatively coupled between a sender computing system and recipient computing devices, executing a controller and thereby performing operations comprising:

executing a machine learning algorithm that trains a process to predict hard bounce rates for lists of email addresses, wherein training the process to predict the hard bounce rates for the lists of email addresses comprises:

obtaining historic lists of email addresses from past email campaigns and a historic hard bounce rate respectively associated with each list, determining historic individual hard bounce rates by running each historic email address on the historic lists of email addresses through an individual-bounce-rate-prediction process to predict a respective historic individual hard bounce rate for the historic email address, combining the historic individual hard bounce rates into a bounce likelihood cumulative distribution, obtaining summary statistics from the bounce likelihood cumulative distribution, and training a classification model to associate the summary statistics with known bounce rates of the respective historic lists, wherein the trained classification model is usable by the trained process for predicting the hard bounce rates for the lists of email addresses;

receiving, from the sender computing system computing system and via a data network, a proposed email and a list of email addresses to be sent the proposed email;

predicting, from the trained process, a hard bounce rate for the list of email addresses;

determining that the hard bounce rate exceeds a threshold; and transmitting, based on the hard bounce rate exceeding the threshold, data to the sender computing system computing system indicating that the proposed email is a flagged email.

9. The method of claim 8, wherein predicting the hard bounce rate for the list of email addresses comprises applying the trained process to features of the email addresses, the features comprising one or more of:

a respective number of publicly available lists on which of each email address is found;

a respective number of purchased lists on which of each email address is found;

a respective number of scraped lists on which of each email address is found; and a respective number of stolen lists on which of each email address is found.

10. The method of claim 8, wherein the service provider computing device includes or is communicatively coupled to an email server that communicates with the recipient computing devices, the operations further comprising:

receiving an additional proposed email from the sender computing system or an additional sender computing system;

receiving an additional list of email addresses to be sent the additional proposed email;

predicting, from the trained process, an additional hard bounce rate for the additional list of email addresses;

determining that the additional hard bounce rate does not exceed the threshold; and configuring, based on the additional hard bounce rate not exceeding the threshold, the email server for sending the additional proposed email to the recipient computing devices.

11. The method of claim 8, wherein the service provider computing device includes or is communicatively coupled to an email server that communicates with the recipient computing devices, the operations further comprising:

receiving an additional proposed email from the sender computing system or an additional sender computing system;

receiving an additional list of email addresses to be sent the additional proposed email;

predicting, from the trained process, an additional hard bounce rate for the additional list of email addresses;

determining that the additional hard bounce rate falls between the threshold and a lower threshold;

configuring the email server for sending the proposed email to a subset of the recipient computing devices associated with a subset of email addresses from the list of email addresses;

determining that a number of transmissions of the proposed email result in hard bounces; and transmitting, based on the determined number of transmissions exceeding a hard bounce threshold, a notification that the additional proposed email is the flagged email.

12. The method of claim 8, wherein the service provider computing device includes or is communicatively coupled to an email server that communicates with the recipient computing devices, the operations further comprising:
- receiving an additional proposed email from the sender computing system or an additional sender computing system;
- receiving an additional list of email addresses to be sent the additional proposed email;
- predicting, from the trained process, an additional hard bounce rate for the additional list of email addresses;
- determining that the additional hard bounce rate falls between the threshold and a lower threshold;
- configuring the email server for sending the proposed email to a subset of the recipient computing devices associated with a subset of email addresses from the list of email addresses;
- determining that a number of transmissions of the proposed email result in hard bounces; and
- configuring, based on the number of transmissions being below a hard bounce threshold, the email server for sending the additional proposed email to additional computing devices at email addresses on the additional list of email addresses to which the additional proposed email had not been previously sent.

13. The method of claim 8, wherein predicting the hard bounce rate for the list of email addresses comprises:
- determining predicted individual hard bounce rates for respective email addresses on the list of email addresses; and
- predicting the hard bounce rate for the list of email addresses based on the predicted individual hard bounce rates.

14. The method of claim 8, the operations further comprising training the individual-bounce-rate-prediction process, wherein training the individual-bounce-rate-prediction process comprises:
- selecting training email addresses and training transmission data, wherein the training transmission data comprises, for each training email address, respective profile data describing (i) a set of characteristics of the training email address and (ii) send result data for the training email address;
- accessing an address-level classification model;
- iteratively modifying the address-level classification model based on the selected training email addresses and the selected training transmission data; and
- outputting the address-level classification model, as iteratively modified, for use in the individual-bounce-rate-prediction process.

15. A non-transitory computer-readable medium having code for a controller stored thereon that is executable by a service provider computing device, which is communicatively coupled between a sender computing system and recipient computing devices, wherein the code, when executed by the service provider computing device, configures the service provider computing device to perform operations comprising:
- executing a machine learning algorithm that trains a process to predict hard bounce rates for lists of email addresses, wherein training the process to predict the hard bounce rates for the lists of email addresses comprises:
  - obtaining historic lists of email addresses from past email campaigns and a historic hard bounce rate respectively associated with each list,
  - determining historic individual hard bounce rates by running each historic email address on the historic lists of email addresses through an individual-bounce-rate-prediction process to predict a respective historic individual hard bounce rate for the historic email address,
  - combining the historic individual hard bounce rates into a bounce likelihood cumulative distribution,
  - obtaining summary statistics from the bounce likelihood cumulative distribution, and
  - training a classification model to associate the summary statistics with known bounce rates of the respective historic lists, wherein the trained classification model is usable by the trained process for predicting the hard bounce rates for the lists of email addresses;
- receiving, from the sender computing system computing system and via a data network, a proposed email and a list of email addresses to be sent the proposed email;
- predicting, from the trained process, a hard bounce rate for the list of email addresses;
- determining that the hard bounce rate exceeds a threshold; and
- transmitting, based on the hard bounce rate exceeding the threshold, data to the sender computing system computing system indicating that the proposed email is a flagged email.

16. The non-transitory computer-readable medium of claim 15, wherein predicting the hard bounce rate for the list of email addresses comprises applying the trained process to features of the email addresses, the features comprising one or more of:
- a respective number of publicly available lists on which of each email address is found;
- a respective number of purchased lists on which of each email address is found;
- a respective number of scraped lists on which of each email address is found; and
- a respective number of stolen lists on which of each email address is found.

17. The non-transitory computer-readable medium of claim 15, the operations further comprising:
- receiving an additional proposed email from the sender computing system or an additional sender computing system;
- receiving an additional list of email addresses to be sent the additional proposed email;
- predicting, from the trained process, an additional hard bounce rate for the additional list of email addresses;
- determining that the additional hard bounce rate does not exceed the threshold; and
- configuring, based on the additional hard bounce rate not exceeding the threshold, an email server for sending the additional proposed email to the recipient computing devices.

18. The non-transitory computer-readable medium of claim 15, the operations further comprising:
- receiving an additional proposed email from the sender computing system or an additional sender computing system;
- receiving an additional list of email addresses to be sent the additional proposed email;
- predicting, from the trained process, an additional hard bounce rate for the additional list of email addresses;
- determining that the additional hard bounce rate falls between the threshold and a lower threshold;

configuring an email server for sending the proposed email to a subset of the recipient computing devices associated with a subset of email addresses from the list of email addresses;

determining that a number of transmissions of the proposed email result in hard bounces; and transmitting, based on the determined number of transmissions exceeding a hard bounce threshold, a notification that the additional proposed email is the flagged email.

19. The non-transitory computer-readable medium of claim 15, the operations further comprising:

receiving an additional proposed email from the sender computing system or an additional sender computing system;

receiving an additional list of email addresses to be sent the additional proposed email;

predicting, from the trained process, an additional hard bounce rate for the additional list of email addresses;

determining that the additional hard bounce rate falls between the threshold and a lower threshold;

configuring an email server for sending the proposed email to a subset of the recipient computing devices associated with a subset of email addresses from the list of email addresses;

determining that a number of transmissions of the proposed email result in hard bounces; and configuring, based on the number of transmissions being below a hard bounce threshold, the email server for sending the additional proposed email to additional computing devices at email addresses on the additional list of email addresses to which the additional proposed email had not been previously sent.

20. The non-transitory computer-readable medium of claim 15, wherein predicting the hard bounce rate for the list of email addresses comprises:

determining predicted individual hard bounce rates for respective email addresses on the list of email addresses; and predicting the hard bounce rate for the list of email addresses based on the predicted individual hard bounce rates.

\* \* \* \* \*